(12) United States Patent
Nanbu et al.

(10) Patent No.: US 11,199,244 B2
(45) Date of Patent: Dec. 14, 2021

(54) STRING STOPPER

(71) Applicant: YKK Corporation, Tokyo (JP)

(72) Inventors: Madoka Nanbu, Kurobe (JP); Legong Ma, Kurobe (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 17/022,916

(22) Filed: Sep. 16, 2020

(65) Prior Publication Data

US 2021/0088107 A1   Mar. 25, 2021

(30) Foreign Application Priority Data

Sep. 19, 2019 (JP) .............................. JP2019-170310
Apr. 24, 2020 (JP) .............................. JP2020-077321

(51) Int. Cl.
*F16G 11/10* (2006.01)

(52) U.S. Cl.
CPC .................................. *F16G 11/10* (2013.01)

(58) Field of Classification Search
CPC .... F16G 11/10; F16G 11/101; Y10T 24/3969; Y10T 24/3984; Y10T 24/3713; Y10T 24/3973; Y10T 24/3996; Y10T 403/4345
See application file for complete search history.

(56) References Cited

U.S. PATENT DOCUMENTS

| | | | | |
|---|---|---|---|---|
| 2,573,806 A | * | 11/1951 | Paterson | F16G 11/105 403/216 |
| 3,007,220 A | * | 11/1961 | Hafner | F16G 11/101 403/18 |
| 4,156,574 A | * | 5/1979 | Boden | F16G 11/106 24/115 M |
| 4,665,590 A | * | 5/1987 | Udelhofen | F16G 11/101 24/115 H |
| 5,454,140 A | | 10/1995 | Murai | |
| 5,894,639 A | * | 4/1999 | Boden | F16G 11/106 24/115 G |
| 6,775,928 B2 | * | 8/2004 | Grande | A43C 7/00 24/115 G |
| 8,321,999 B2 | * | 12/2012 | Boden | F16G 11/106 24/136 R |

(Continued)

FOREIGN PATENT DOCUMENTS

JP   H07-039406 A   2/1995

*Primary Examiner* — Robert Sandy
*Assistant Examiner* — Rowland Do
(74) *Attorney, Agent, or Firm* — Kilpatrick Townsend & Stockton LLP

(57) ABSTRACT

There is provided a string stopper including: a plug including: a plug base portion which includes plate-shaped portions and connection portion connecting the plate-shaped portions; a leg portion which includes a protruding portion; and a plug opening which is formed from the connection portion to both sides of the leg portion; and a socket including: a socket base portion; and a socket opening which is formed of a hole having an inclined surface, and which is configured to accommodate a tip end of the protruding portion. When a string-shaped member is installed, the string-shaped member passes between the protruding portion and the inclined surface, the string-shaped member passing through the plug opening, exiting from the plug through a side of the leg portion, passing through the socket opening and exiting from the socket.

12 Claims, 14 Drawing Sheets

(56) References Cited

U.S. PATENT DOCUMENTS

| | | | |
|---|---|---|---|
| 2005/0155194 A1* | 7/2005 | Christiansson | B63C 9/22 24/326 |
| 2005/0166369 A1* | 8/2005 | Takahashi | A43C 7/08 24/136 R |
| 2006/0130289 A1* | 6/2006 | Tracy | F16G 11/101 24/115 G |
| 2018/0153262 A1* | 6/2018 | Shimizu | A43C 7/04 |
| 2019/0078646 A1* | 3/2019 | Shimizu | F16G 11/044 |
| 2019/0285138 A1* | 9/2019 | Shimizu | A44B 13/0035 |

* cited by examiner

STRING STOPPER

CROSS-REFERENCE TO RELATED APPLICATIONS

This application is based on Japanese Patent Application No. 2019-170310 filed on Sep. 19, 2019 and Japanese Patent Application No. 2020-077321 filed on Apr. 24, 2020, the contents of which are incorporated herein by way of reference.

BACKGROUND

The present invention relates to a string stopper used for tightening an equipped string.

In the related art, a string tightening tool is disclosed in which a string is stopped and released by inserting a sliding body into a case, inserting a guide portion into a sliding port, and sandwiching handles so as to make the sliding body slide, and a new insertion operation of the string is performed by pushing and making the guide portion enter into the sliding body so as to separate the sliding body from the case (see Patent Literature 1).

Patent Literature 1: JP-A-H7-39406

The string tightening tool described in Patent Literature 1 is formed to press the handles against a side wall by an elastic force of elastic portions provided opposite to each other in a protruding shape close to tip ends of the handles. However, each of the elastic portions is formed of a thin piece, and strength thereof may decrease due to creep deformation and the like. Further, in order to obtain the elastic force, the elastic portion is needed to be formed into a long piece shape, and the string tightening tool becomes large in size.

SUMMARY

The present invention provides a string stopper which is small in size, has a small decrease in strength, a long life, and good operability, can move smoothly, and can be accurately fixed to a string-shaped member.

According to one aspect of the present invention, there is provided a string stopper including: a plug including: a plug base portion which includes two of plate-shaped portions arranged in parallel and at least one connection portion connecting the two of plate-shaped portions; a leg portion which includes a sandwiched portion sandwiched between parts of the plate-shaped portions, and a tapered rectangular parallelepiped protruding portion protruding from the sandwiched portion; and a plug opening which is formed from the connection portion to both sides of the leg portion by connecting the two of plate-shaped portions with the connection portion at an opposite side of the leg portion; and a socket including: a socket base portion; and a socket opening which is formed of a hole penetrating the socket base portion and having a tapered inclined surface, and which is configured to accommodate a tip end of the protruding portion. The plug and the socket are configured such that, when a string-shaped member is installed, the string-shaped member passes between the protruding portion and the inclined surface, the string-shaped member passing through the plug opening, exiting from the plug through a side of the leg portion, passing through the socket opening and exiting from the socket.

According to other aspect of the present invention, the sandwiched portion includes a side surface portion exposed in the plug opening. The protruding portion includes a locking portion in which a recessed groove is formed on a surface continuous from the side surface portion.

According to other aspect of the present invention, the groove formed in the locking portion includes at least a first groove formed in a predetermined direction and a second groove formed in a direction intersecting the first groove.

According to other aspect of the present invention, the side surface portion is formed of a curved surface.

According to other aspect of the present invention, the protruding portion includes convex sliding portions at tip ends of two surfaces of the sandwiched portion sandwiched between the two of plate-shaped portions. The socket base portion includes: a recessed portion formed on the socket opening side and the plug base portion side; a guide portion which guides the sliding portion and which is formed in a groove shape on the socket opening side and an opposite side of the plug base portion; and a narrow passage portion protruding between the recessed portion and the guide portion.

According to other aspect of the present invention, the protruding portion includes a groove-shaped slit portion formed between two of the sliding portions.

According to other aspect of the present invention, a side surface from the connection portion of the plug base portion toward the protruding portion is opened.

According to other aspect of the present invention, the string stopper is fixed only by a frictional force between the string stopper and the string-shaped member by merely bringing the plug and the socket relatively close to each other. The string stopper is movable with respect to the string-shaped member by merely bringing the plug and the socket relatively away from each other.

According to other aspect of the present invention, a space between the connection portions of the plug is disposed on an inner side of an extension line of a portion of the protruding portion of the leg portion, the portion sandwiching the string-shaped member with the inclined surface of the socket.

According to other aspect of the present invention, when an interval between the connection portions is set as A, a maximum width of the leg portion is set as B, and a diameter of the string-shaped member is set as D, a following condition (1) is satisfied.

$$D<A<B+2D \qquad (1)$$

According to other aspect of the present invention, a relationship between the interval A of the connection portions and the maximum width B of the leg portion satisfies a following condition (2).

$$0.3<B/A<2.0 \qquad (2)$$

According to other aspect of the present invention, in the socket, a tape attachment portion to which a tape to be attached to another member is attached, is formed on a back side of the guide portion on one side of the socket base portion.

DESCRIPTION OF EMBODIMENTS

Hereinafter, a string stopper 1 according to an embodiment of the present invention will be specifically described with reference to the drawings.

Figure 1:
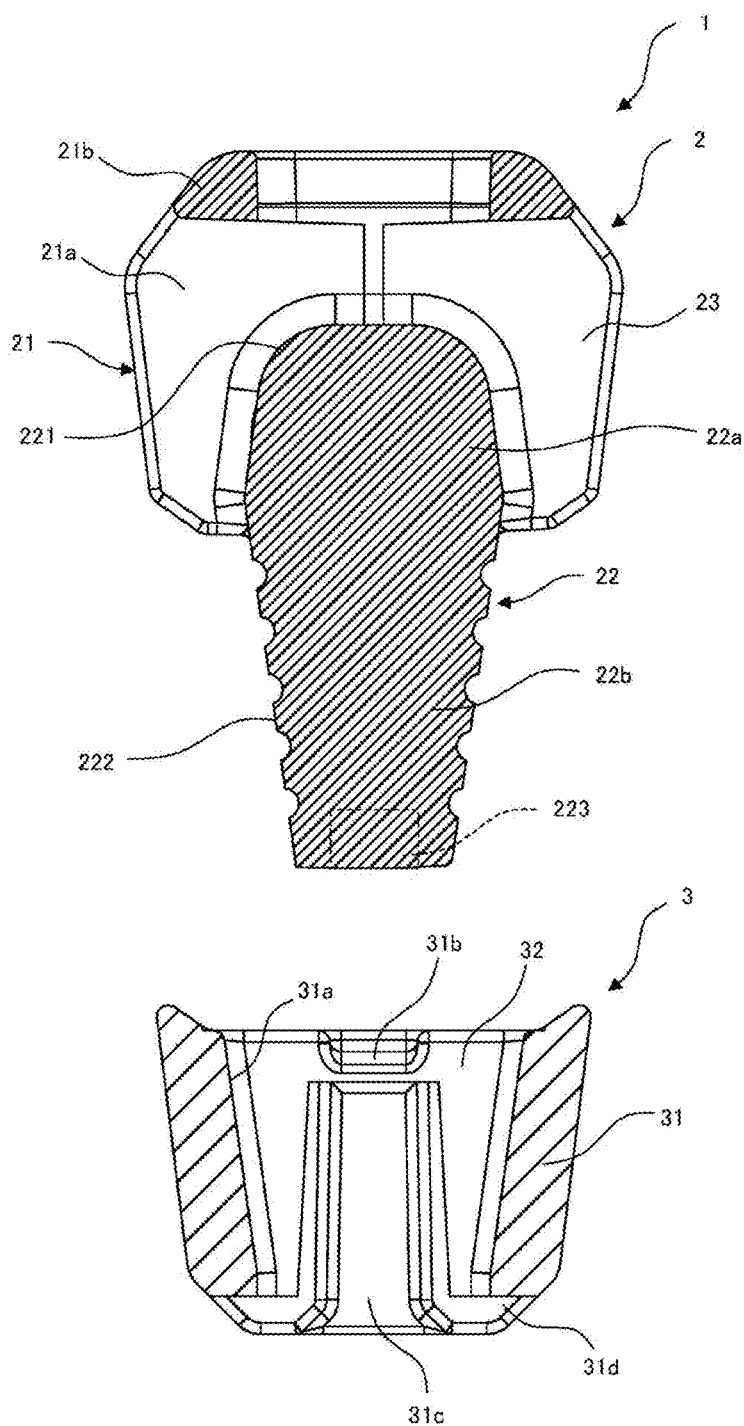
FIG. 1 shows a cross-sectional view of a plug and a socket that form a string stopper according to a first embodiment.
Figure 2:
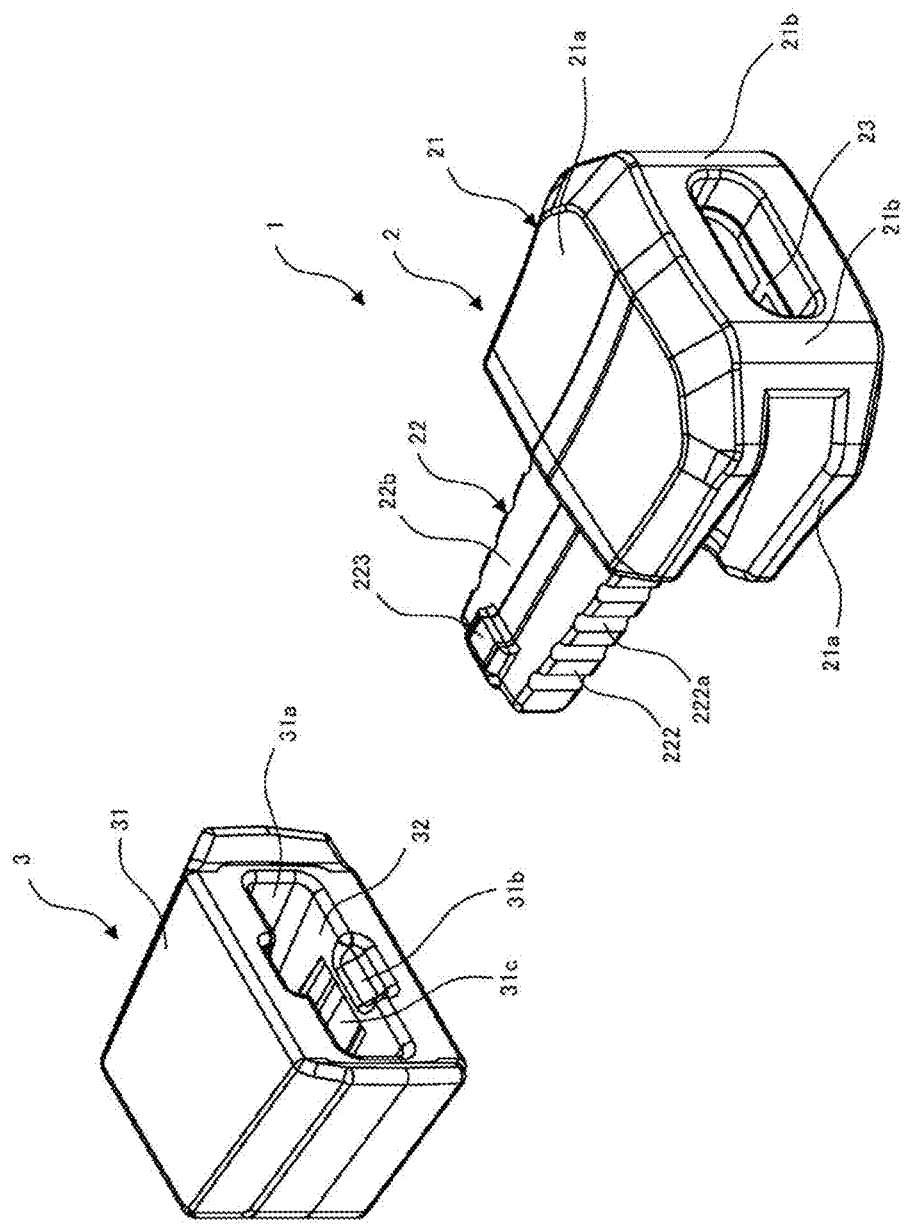
FIG. 2 shows a perspective view of the plug and the socket that form the string stopper according to the first embodiment.

FIG. 1 shows a cross-sectional view of a plug 2 and a socket 3 that form the string stopper 1 according to a first embodiment. FIG. 2 shows a perspective view of the plug 2 and the socket 3 that form the string stopper 1 according to the first embodiment. The string stopper 1 is configured by assembling the plug 2 and the socket 3.

The plug 2 includes a plug base portion 21 and a leg portion 22 protruding from the plug base portion 21. The plug base portion 21 and the leg portion 22 are integrally formed by injection molding, but here each portion will be described separately for ease of understanding.

The plug base portion 21 includes two plate-shaped portions 21a arranged in parallel and at least two connection portions 21b connected to the two plate-shaped portions 21a. Parts of the two plate-shaped portions 21a sandwich a part of the leg portion 22. The two connection portions 21b on an opposite side of the portions that sandwich the leg portion 22 are connected to the two plate-shaped portions 21a. Therefore, the plug 2 has a plug opening 23 formed of a hole which is formed from between the connection portions 21b of the plug base portion 21 to both sides of the leg portion 22.

The leg portion 22 has a substantially rectangular parallelepiped shape as a whole, and includes a sandwiched portion 22a sandwiched between the parts of the two plate-shaped portions 21a, and a tapered rectangular parallelepiped protruding portion 22b protruding from the sandwiched portion 22a. The sandwiched portion 22a is sandwiched by the plug base portion 21. Therefore, a side surface portion 221 is exposed in the plug opening 23. The side surface portion 221 is formed of a smooth curved surface. The protruding portion 22b includes locking portions 222 including recessed grooves 222a which are formed on both side surfaces continuous from the side surface portion 221. Convex sliding portions 223 are formed at tip ends of both surfaces of the protruding portion 22b where the locking portions 222 are not formed.

The socket 3 includes a rectangular parallelepiped socket base portion 31. The socket base portion 31 has a socket opening 32 formed of a hole penetrating the socket base portion 31. A side of the socket 3 into which the plug 2 is inserted is set as an insertion side, and the opposite side is set as a non-insertion side.

In the socket opening 32 of the socket base portion 31, inclined surfaces 31a inclined according to a shape of the protruding portion 22b are formed at positions facing the locking portions 222 of the protruding portion 22b when the socket 3 is coupled to the plug 2. On the insertion side of the socket opening 32, recessed portions 31b are formed at positions which first come into contact with the sliding portions 223 when the socket 3 is coupled to the plug 2. Guide portions 31c formed in a groove shape in an insertion direction of the plug 2 are formed on the non-insertion side of the socket opening 32. Notches 31d are formed on the non-insertion side of the inclined surfaces 31a of the socket base portion 31. Narrow passage portions 31e are formed between the recessed portions 31b and the guide portions 31c of the socket opening 32, respectively.

Figure 3:
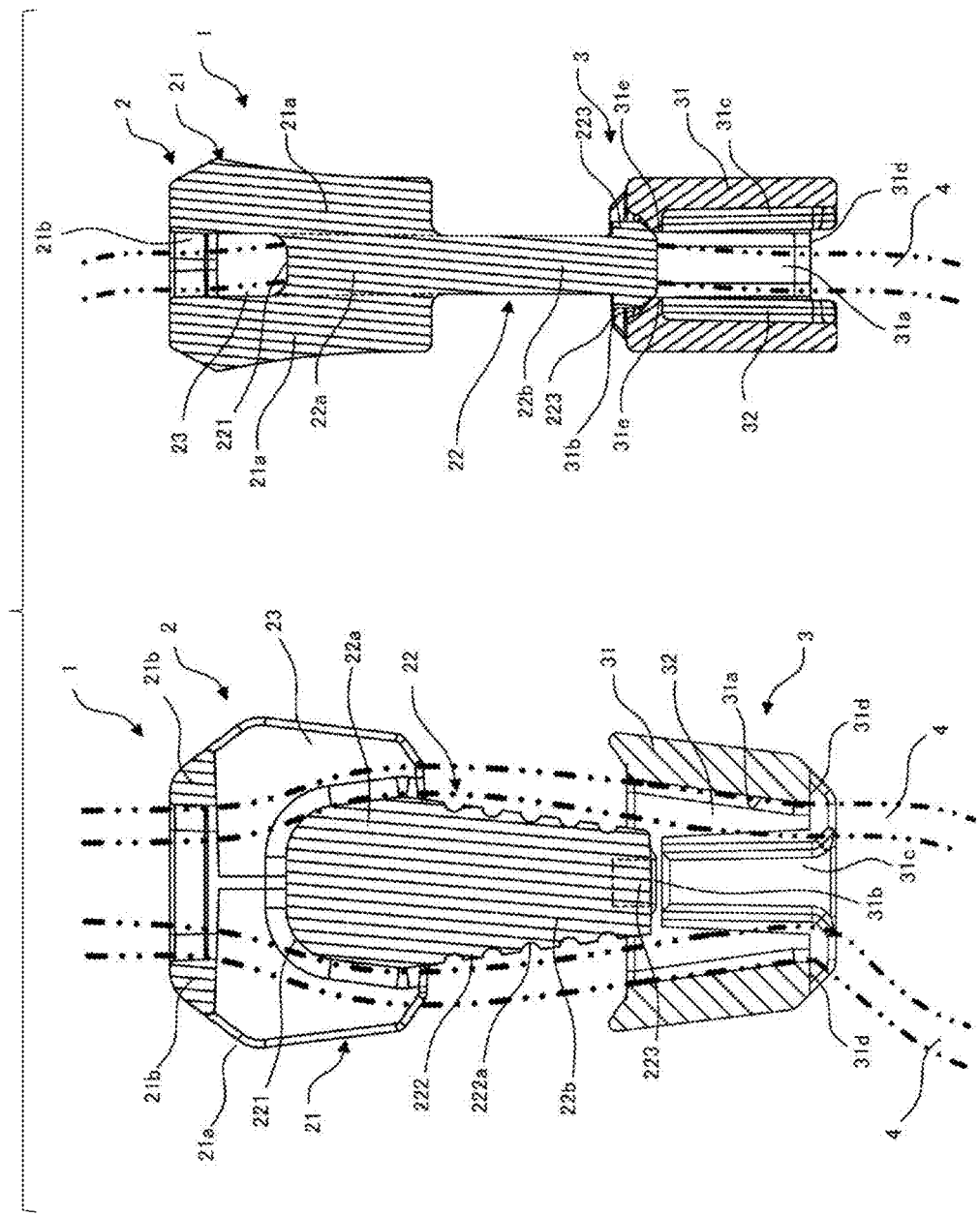
FIG. 3 shows cross-sectional views of the string stopper immediately before assembling of the plug and the socket according to the first embodiment.

FIG. 3 shows cross-sectional views of the string stopper 1 immediately before assembling of the plug 2 and the socket 3 according to the first embodiment.

Before assembling the plug 2 and the socket 3 of the string stopper 1 of the first embodiment, first, an unillustrated assembler passes string-shaped members 4 through the plug 2 and the socket 3. The string-shaped member 4 is an elongated member such as a string, a cord or a wire, and is made of a material such as cotton, linen, silk, polypropylene, nylon, paper or rubber. The number of the string-shaped members 4 may be either one or two.

When the number of the string-shaped members 4 is one, first, the assembler passes the string-shaped member 4 through the plug opening 23 from between the connection portions 21b of the plug 2 and pulls the string-shaped member 4 out from a side of the leg portion 22. Then, the assembler passes the string-shaped member 4 through the socket opening 32 from a recessed portion 31b side of the socket 3 and pulls the string-shaped member 4 out from a guide portion 31c side. Then, the assembler passes the string-shaped member 4 through the socket opening 32 from the guide portion 31c side of the socket 3 and pulls the string-shaped member 4 out from the recessed portion 31b side. Subsequently, the assembler passes the string-shaped member 4 through the plug opening 23 from the side of the leg portion 22 of the plug 2 and pulls the string-shaped member 4 out from between the connection portions 21b.

When the number of the string-shaped members 4 is one, there is also a method of passing the string-shaped member 4 from the socket 3. In this method, the assembler first passes the string-shaped member 4 through the socket opening 32 from the guide portion 31c side of the socket 3, and pulls the string-shaped member 4 out from the recessed portion 31b side. Subsequently, the assembler passes the string-shaped member 4 through the plug opening 23 from the side of the leg portion 22 of the plug 2 and pulls the string-shaped member 4 out from between the connection portions 21b. Then, the assembler passes the string-shaped member 4 through the plug opening 23 from between the connection portions 21b of the plug 2 and pulls the string-shaped member 4 out from the side of the leg portion 22. Then, the assembler passes the string-shaped member 4 through the socket opening 32 from the recessed portion 31b side of the socket 3 and pulls the string-shaped member 4 out from the guide portion 31c side.

When the number of the string-shaped members 4 is two, first, the assembler passes the string-shaped members 4 through the plug opening 23 from between the connection portions 21b of the plug 2 and pulls the string-shaped members 4 out from both sides of the leg portion 22. Then, the assembler passes the string-shaped members 4 through the socket opening 32 from the recessed portion 31b side of the socket 3 and pulls the string-shaped members 4 out from the guide portion 31c side. Further, in another method, the assembler first passes the string-shaped members 4 through the socket opening 32 from the guide portion 31c side of the socket 3, and pulls the string-shaped members 4 out from the recessed portion 31b side. Subsequently, the assembler passes the string-shaped members 4 through the plug opening 23 from the both sides of the leg portion 22 of the plug 2 and pulls the string-shaped members 4 out from between the connection portions 21b.

In the string stopper 1 according to the first embodiment, since the string-shaped member 4 passes through both the plug opening 23 and the socket opening 32, even if the plug 2 and the socket 3 are separated from each other, both the plug 2 and the socket 3 do not fall from the string-shaped member 4, and the possibility of losing the plug 2 or the socket 3 is low.

Next, as shown in FIG. 3, the positions of the sliding portion 223 of the plug 2 and the recessed portion 31b of the socket 3 are matched. Then, the plug 2 and the socket 3 are pressed to advance the sliding portions 223 from the recessed portions 31b to the guide portions 31c. Since the thickness of the protruding portion 22b at a portion including the two sliding portions 223 is formed to be thicker than an interval between the opposing narrow passage portions 31e, the sliding portions 223 normally do not ride over the narrow passage portions 31e. However, since the sliding portion 223 is formed in a tapered shape from the tip end and the recessed portion 31b is formed such that the interval becomes narrower toward the inner side, when the plug 2 is further pushed, the socket 3 bends, and the sliding portions 223 can ride over the narrow passage portions 31e from the recessed portions 31b.

Figure 4:
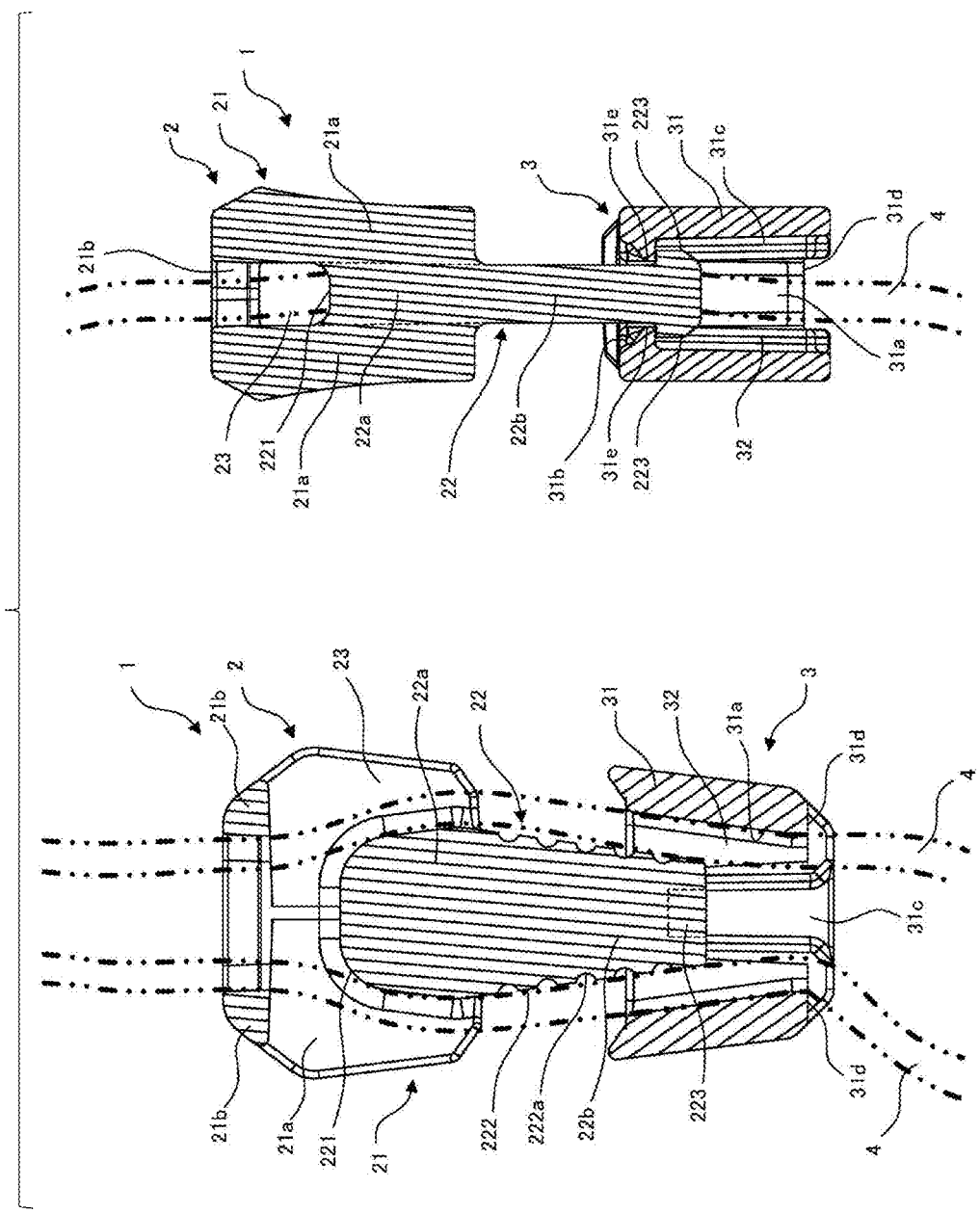
FIG. 4 shows cross-sectional views of the string stopper immediately after the assembling of the plug and the socket according to the first embodiment.

FIG. 4 shows cross-sectional views of the string stopper 1 immediately after the assembling of the plug 2 and the socket 3 according to the first embodiment.

When the plug 2 and the socket 3 are pressed, the sliding portion 223 rides over the narrow passage portion 31e from the recessed portion 31b and advances to the guide portion 31c. The sliding portion 223 that once moved to the guide portion 31c is caught by the narrow passage portion 31e and is difficult to move to the recessed portion 31b. In this way, the sliding portion 223 moves while being guided into the guide portion 31c. Therefore, the plug 2 can be accurately moved with respect to the socket 3. Then, the string stopper 1 can be accurately fixed to the string-shaped members 4. Further, since the sliding portion 223 is caught by the narrow passage portion 31e, the plug 2 is not separated from the socket 3, and the string stopper 1 can be accurately moved with respect to the string-shaped members 4.

When the plug 2 and the socket 3 are in positions shown in FIG. 4, the string-shaped member 4 is not sandwiched by the locking portion 222 of the plug 2 or the inclined surface 31a of the socket 3, and is movable with respect to the string stopper 1. That is, the string stopper 1 is movable with respect to the string-shaped members 4.

In the string stopper 1 in this state, the string-shaped member 4 comes into contact with the side surface portion 221 formed of a smooth curved surface, and deterioration of the string-shaped member 4 can be reduced, and a life of the string-shaped member 4 can be extended.

Figure 5:
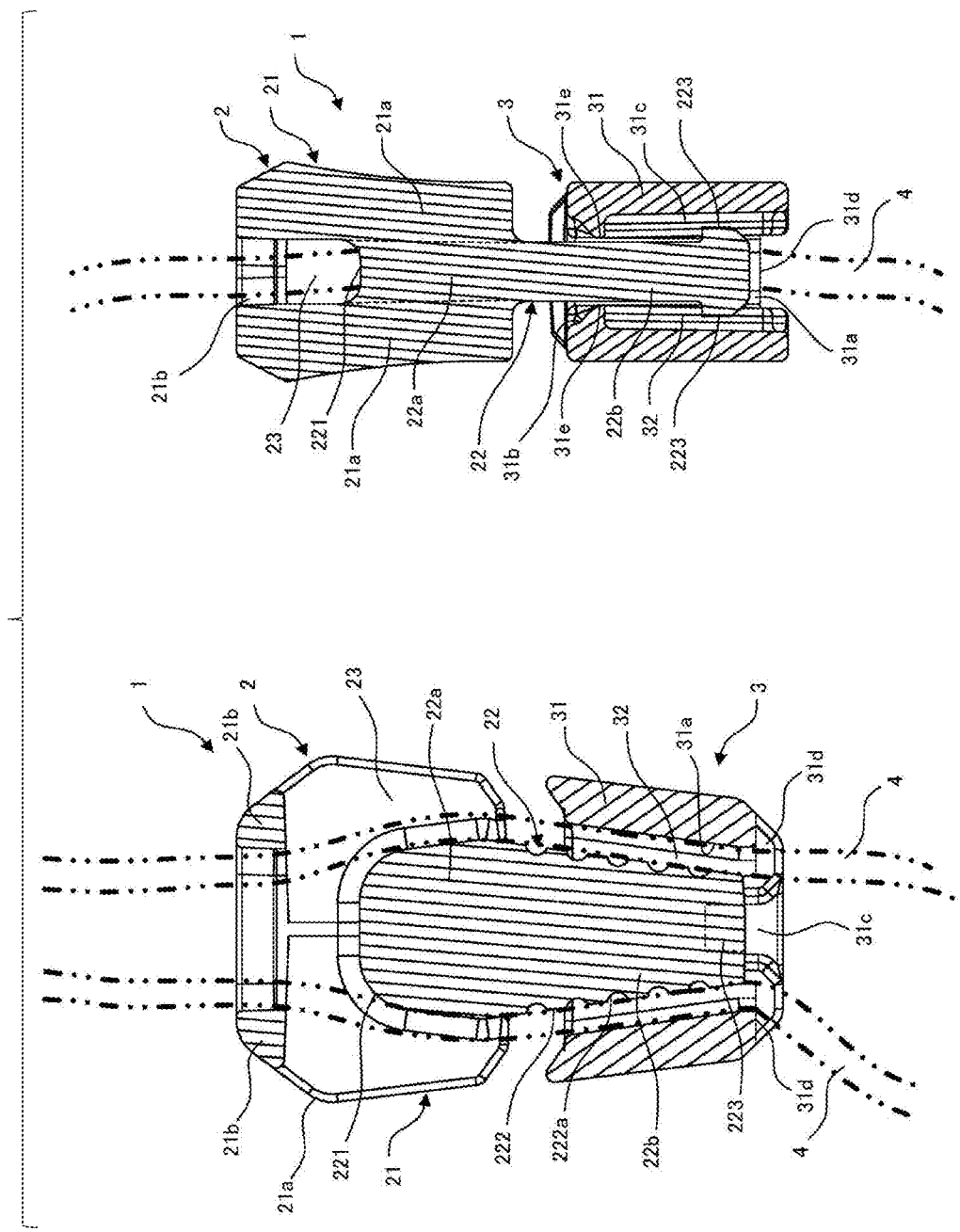
FIG. 5 shows cross-sectional views of the string stopper according to the first embodiment which is fixed to string-shaped members.
Figure 6:
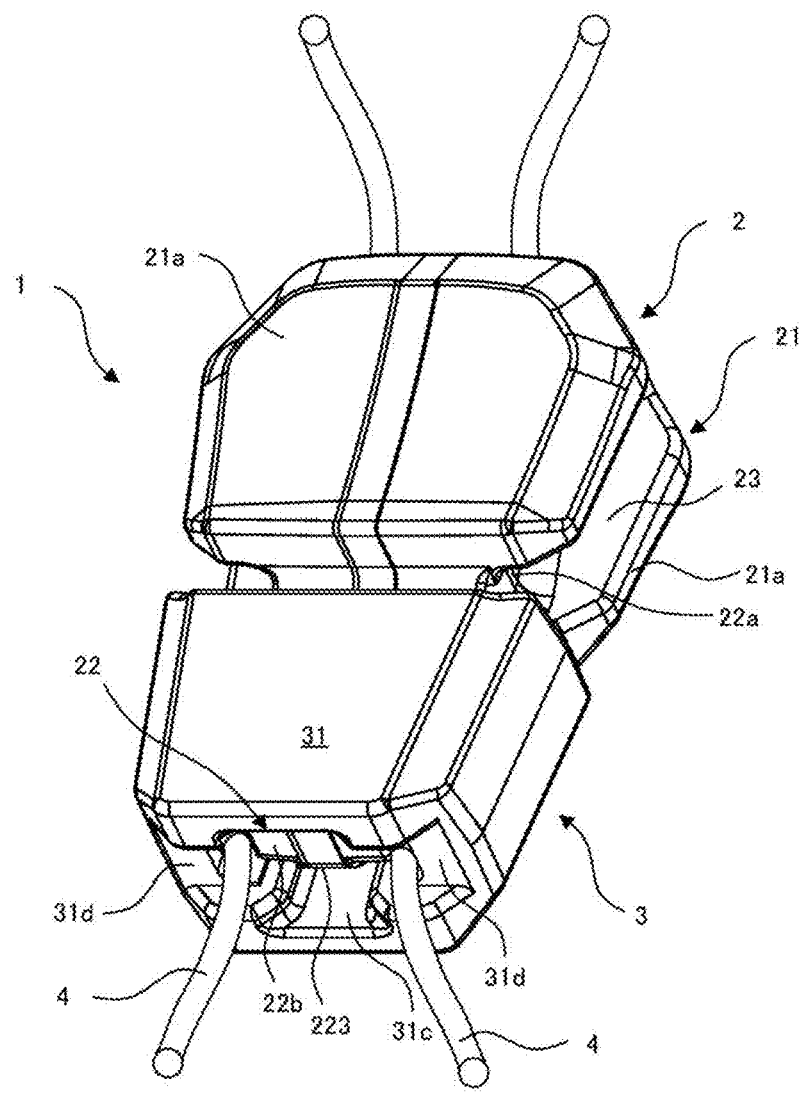
FIG. 6 shows a perspective view of the string stopper according to the first embodiment which is fixed to the string-shaped members.

FIG. 5 shows cross-sectional views of the string stopper 1 according to the first embodiment which is fixed to the string-shaped members 4. FIG. 6 shows a perspective view of the string stopper 1 according to the first embodiment which is fixed to the string-shaped members 4.

After the plug 2 and the socket 3 are assembled, when the string stopper 1 according to the first embodiment is fixed to the string-shaped members 4, the plug 2 and the socket 3 are brought close to each other. That is, while the string-shaped members 4 on the plug 2 side are pulled, the plug 2 is further pushed toward the socket 3 side, or while the string-shaped members 4 on the socket 3 side are pulled, the socket 3 is further pushed toward the plug 2 side. Then, the sliding portion 223 further advances into the guide portion 31c, and the string-shaped member 4 is sandwiched between the locking portion 222 of the leg portion 22 of the plug 2 and the inclined surface 31a of the socket and is fixed. That is, the string stopper 1 is fixed to the string-shaped members 4.

As described above, the string stopper 1 according to the first embodiment does not use an elastic action when the string stopper 1 is fixed to the string-shaped members 4. Therefore, the string stopper 1 can be easily fixed to the string-shaped members 4 by merely bringing the plug 2 and the socket 3 relatively close to each other with a small force without applying the elastic action. Further, the string stopper 1 according to the first embodiment does not use an elastic member whose strength decreases due to the creep deformation and which requires a large space. Therefore, the string stopper 1 is small in size, has a small decrease in strength, a long life, and good operability, can move smoothly, and can be accurately fixed to the string-shaped members 4.

In the string stopper 1 according to the first embodiment, the leg portion 22 of the plug 2 does not penetrate through the socket opening 32 of the socket 3 in a state in which the string stopper 1 is fixed to the string-shaped members 4. That is, the sliding portion 223 formed at an end portion of the leg portion 22 is housed in the socket opening 32 of the socket 3. Therefore, a tip end side of the leg portion 22 of the plug 2 can be protected at all times.

In the string stopper 1 according to the first embodiment, the locking portion 222 is formed by the plurality of recessed grooves 222a formed in a part of a flat surface continuous from the side surface portion 221. The string-shaped member 4 comes into contact with the flat surface of the locking portion 222. Accordingly, the deterioration of the string-shaped member 4 can be reduced while the friction is increased, and the life of the string-shaped member 4 can be extended.

When the string stopper 1 is moved from the state in which the string stopper 1 is fixed to the string-shaped members 4 shown in FIG. 5 to the state shown in FIG. 4, the plug 2 and the socket 3 are relatively moved away from each other. That is, while the string-shaped members 4 on the plug 2 side are pulled, the socket 3 is pulled to the opposite side, or while the string-shaped members 4 on the socket 3 side are pulled, the plug 2 is pulled to the opposite side. Then, the plug 2 and the socket 3 are separated from each other, and the string-shaped members 4 are movable with respect to the string stopper 1. That is, the string stopper 1 is movable with respect to the string-shaped members 4.

As described above, the string stopper 1 according to the first embodiment does not use the elastic action when the string stopper 1 is fixed to the string-shaped members 4. Therefore, the string stopper 1 can be easily moved with respect to the string-shaped members 4 by merely bringing the plug 2 and the socket 3 relatively away from each other with a small force without releasing the elastic action. Further, since the elastic member whose strength decreases due to the creep deformation and which requires a large space is not used, the string stopper 1 according to the first embodiment is small in size, has a small decrease in strength, a long life, and good operability, can move smoothly, and can be accurately fixed to the string-shaped members 4. Further, a side surface from the connection portion 21b of the plug base portion 21 toward the protruding portion 22b is opened.

Figure 7:
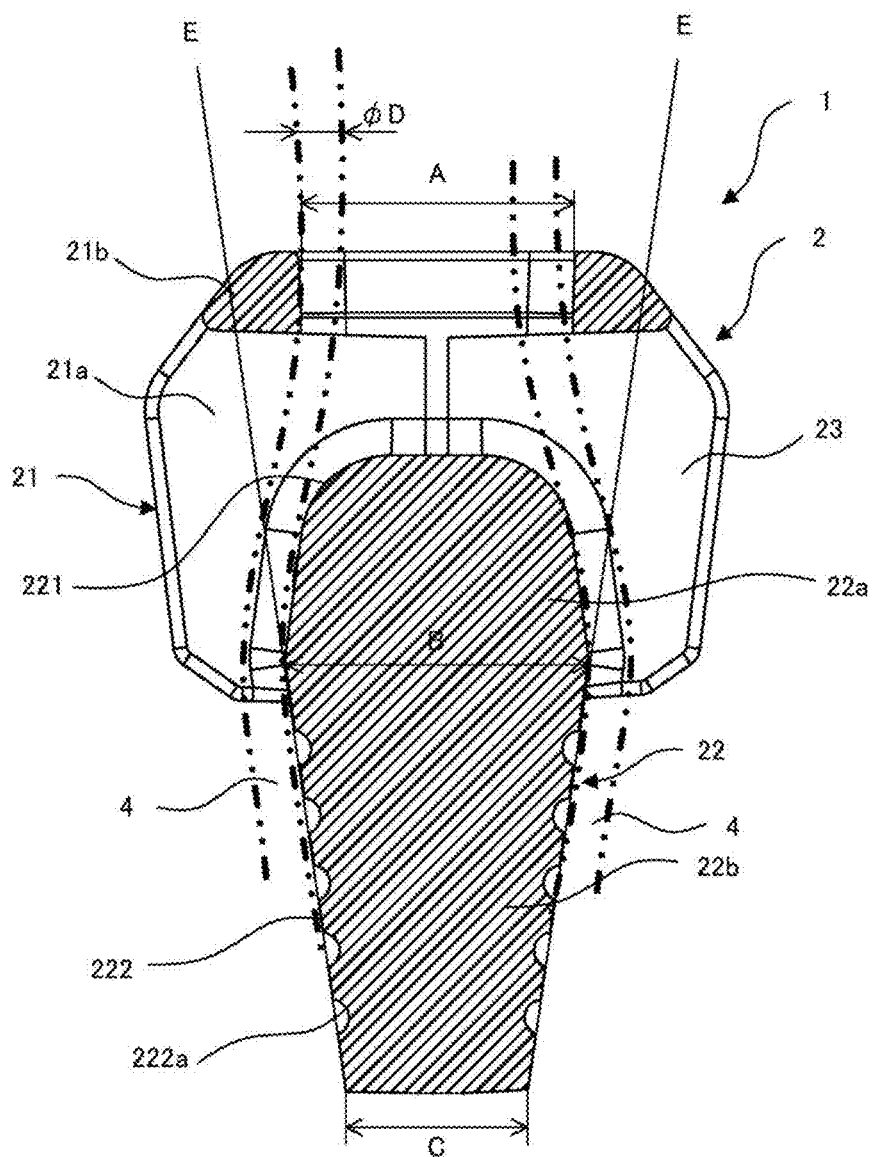
FIG. 7 shows an example of a dimensional relationship of the plug of the string stopper according to the first embodiment.

FIG. 7 shows an example of a dimensional relationship of the plug 2 of the string stopper 1 according to the first embodiment.

In the string stopper 1 of the first embodiment, a frictional force between the string stopper 1 and the string-shaped member 4 is needed to be not too strong in order to enable appropriate movement with respect to the string-shaped member 4. Further, in the string stopper 1, in order to fix the plug 2 and the socket 3 more strongly, the frictional force between the string stopper 1 and the string-shaped member 4 is needed to be not too weak.

Therefore, the string stopper 1 is brought into surface contact with the string-shaped member 4 from the side surface portion 221 of the leg portion 22 to the locking portion 222, and the frictional force is not dispersed in a width direction. Further, the string-shaped member 4 passes through an inner side of an extension line E of a portion of the protruding portion 22b of the leg portion 22 that sandwiches the string-shaped member 4 with the inclined surface 31a of the socket 3. That is, an inner end of each of the connection portions 21b of the plug 2 is formed at the inner side of the extension line E, and the string-shaped member 4 passes through the inner side of the connection portion 21b. The string-shaped member 4 has an S shape or an inverted S shape in the vicinity of the connection portion 21b and the leg portion 22.

Specifically, when an interval between the connection portions 21b is set as A, a maximum width of the leg portion 22 is set as B, and a diameter of the string-shaped member 4 is set as D, the following condition (1) is satisfied.

$$D < A < B + 2D \quad (1)$$

Further, a relationship between the interval A of the connection portions 21b and the maximum width B of the leg portion 22 satisfies the following condition (2).

$$0.3 < B/A < 2.0 \quad (2)$$

Preferably, the relationship between the interval A of the connection portions 21b and the maximum width B of the leg portion 22 satisfies the following condition (2').

$$0.5 < B/A < 1.8 \quad (2')$$

More preferably, the relationship between the interval A of the connection portions 21b and the maximum width B of the leg portion 22 satisfies the following condition (2").

$$0.58 < B/A < 1.69 \quad (2'')$$

In this way, since the string stopper 1 is brought into surface contact with the string-shaped member 4 from the side surface portion 221 of the leg portion 22 to the locking portion 222 and the frictional force is not dispersed in the width direction, an appropriate frictional force can be obtained. The frictional force can appropriately move the string-shaped members 4 with respect to the string stopper 1. Further, the string stopper 1 can generate the appropriate frictional force between the string-shaped member 4 and the leg portion 22. Then, the frictional force can accurately hold the plug 2 and the socket 3.

Next, the string stopper 1 according to a second embodiment will be described. Portions of the string stopper 1 of the second embodiment that are not described may have similar structures as those of the first embodiment.

Figure 8:
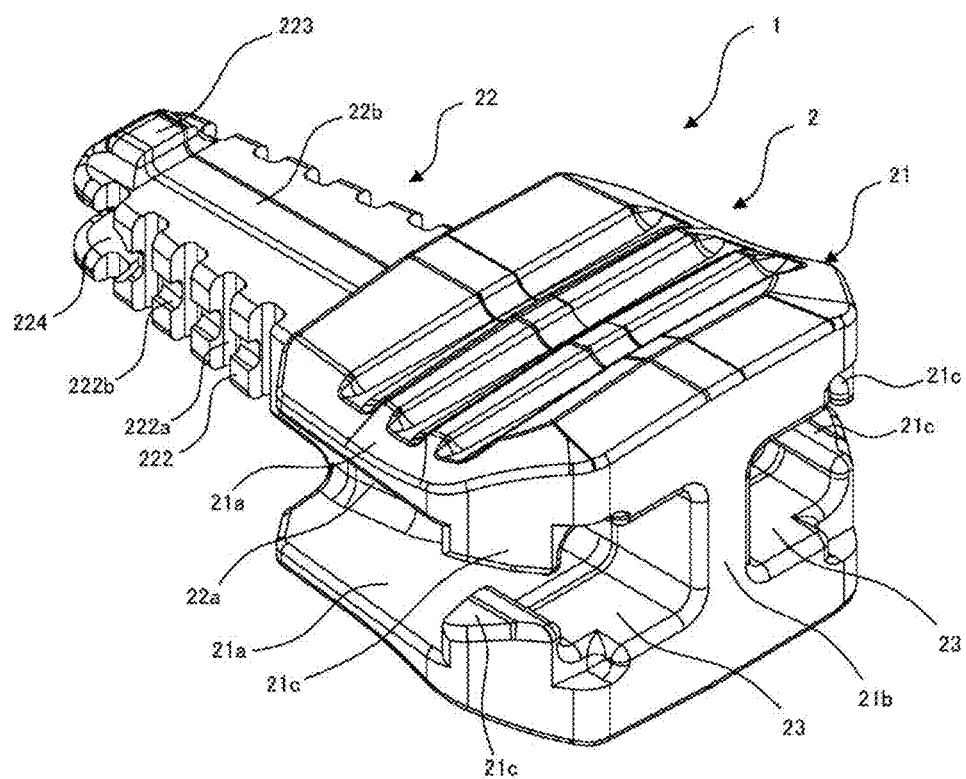
FIG. 8 shows a perspective view of a plug according to a second embodiment as viewed from a base portion side.
Figure 9:
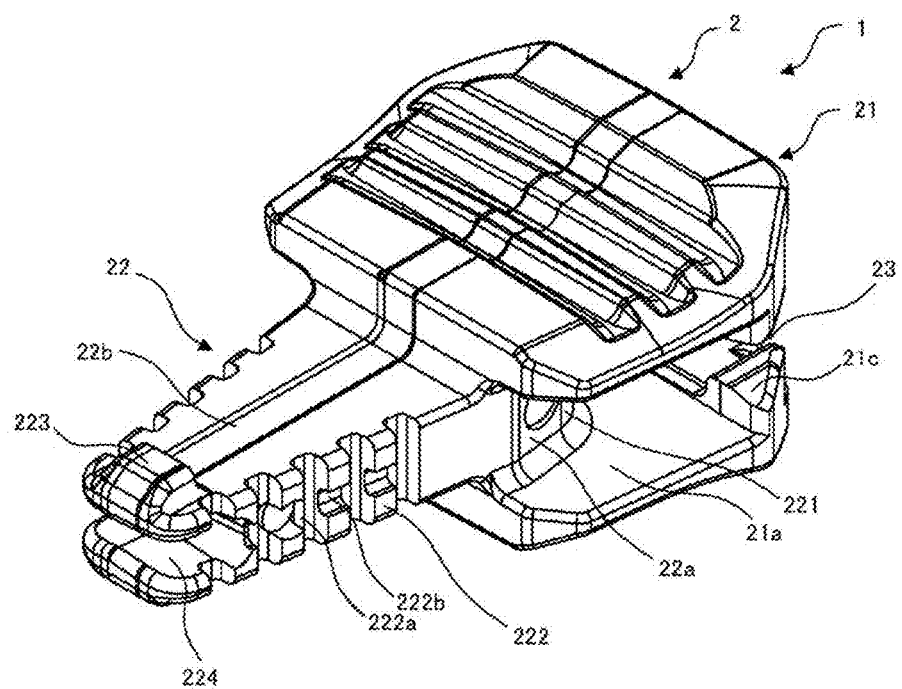
FIG. 9 shows a perspective view of the plug according to the second embodiment as viewed from a leg portion side.
Figure 10:
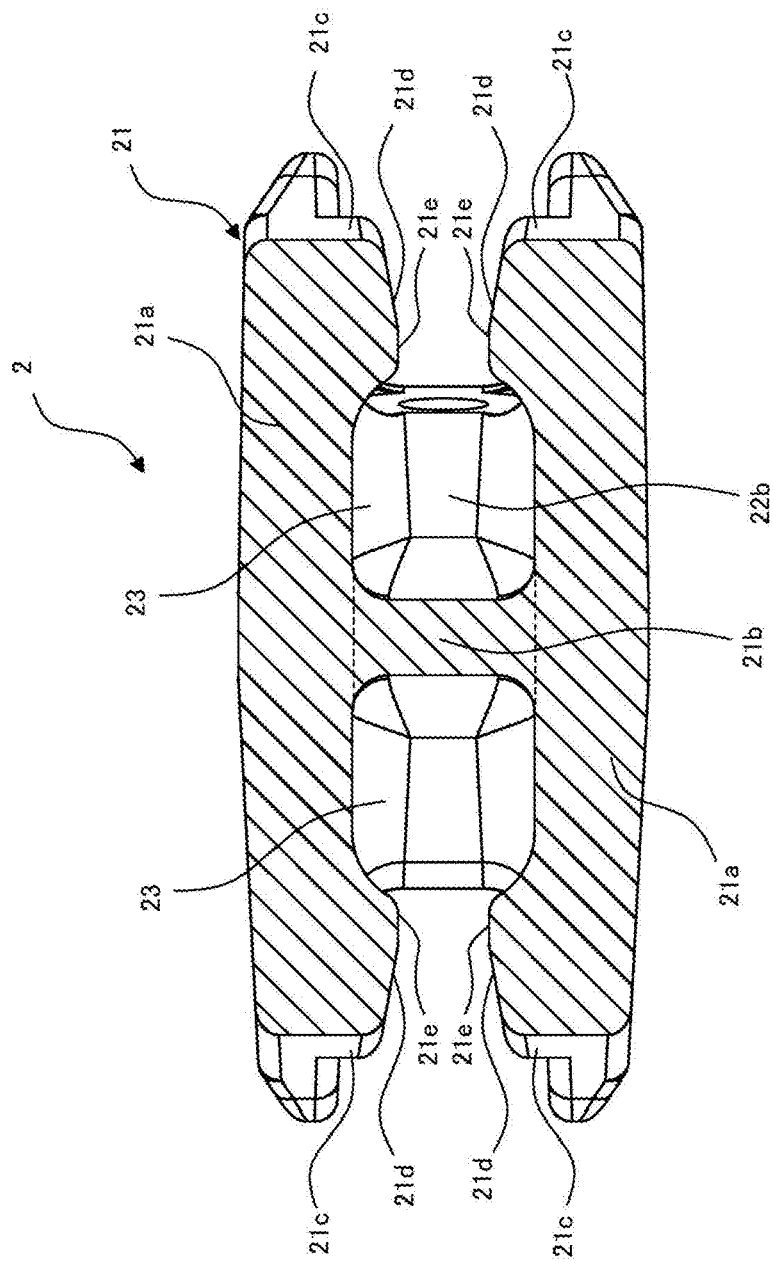
FIG. 10 shows a cross section including wall portions of the plug according to the second embodiment.

FIG. 8 shows a perspective view of the plug 2 according to the second embodiment as viewed from a base portion 21 side. FIG. 9 shows a perspective view of the plug 2 according to the second embodiment as viewed from a leg portion 22 side. FIG. 10 shows a cross section including wall portions 21c of the plug 2 according to the second embodiment.

The position of the connection portion 21b of the plug 2 according to the second embodiment is changed as compared with the first embodiment. The connection portion 21b according to the second embodiment extends from the sandwiched portion 22a of the leg portion 22 in a direction opposite to the protruding portion 22b, and connects the two plate-shaped portions 21a of the plug base portion 21. Therefore, the plug 2 according to the second embodiment has two plug openings 23 formed on both sides of one connection portion 21b.

Wall portions 21c are formed at both side ends of the two plug openings 23 that face the connection portion 21b. The wall portions 21c protrude so as to approach each other from the two plate-shaped portions 21a, respectively. As shown in FIG. 10, first, facing portions 21d facing each other of the respective wall portions 21c are formed in a tapered shape in which a distance between the facing portions becomes closer from the both end sides of the plate-shaped portions 21a to the connection portion 21b. Then, shortest interval portions 21e are formed in which a distance between the facing portions at predetermined positions is the shortest. At predetermined portions approaching the connection portion 21b from the shortest interval portions 21e, a distance between the facing portions is increased. That is, on the page of FIG. 10, the shortest interval portions 21e are formed to protrude from above and below.

With such a structure, a string can be easily attached by merely passing through the shortest interval portions 21e from between the facing portions 21d of the wall portions 21c. The string attached to the plug opening 23 can be made less likely to come off by the wall portions 21c.

In the leg portion 22 of the second embodiment, a slit portion 224 is formed at a tip end of the protruding portion 22b which is at an opposite side of the plug base portion 21. The slit portion 224 is formed between the two sliding portions 223. By forming the slit portion 224, the protruding portion 22b can be bent toward the slit portion 224 side when the sliding portions 223 are pushed.

Further, in the second embodiment, second grooves 222b are further formed in a direction intersecting the first grooves 222a of the locking portion 222 of the leg portion 22 formed in the first embodiment. The first groove 222a and the second groove 222b are preferably orthogonal to each other. By forming the second groove 222b in this manner, a frictional force between the string and the locking portion 222 can be increased.

Figure 11:
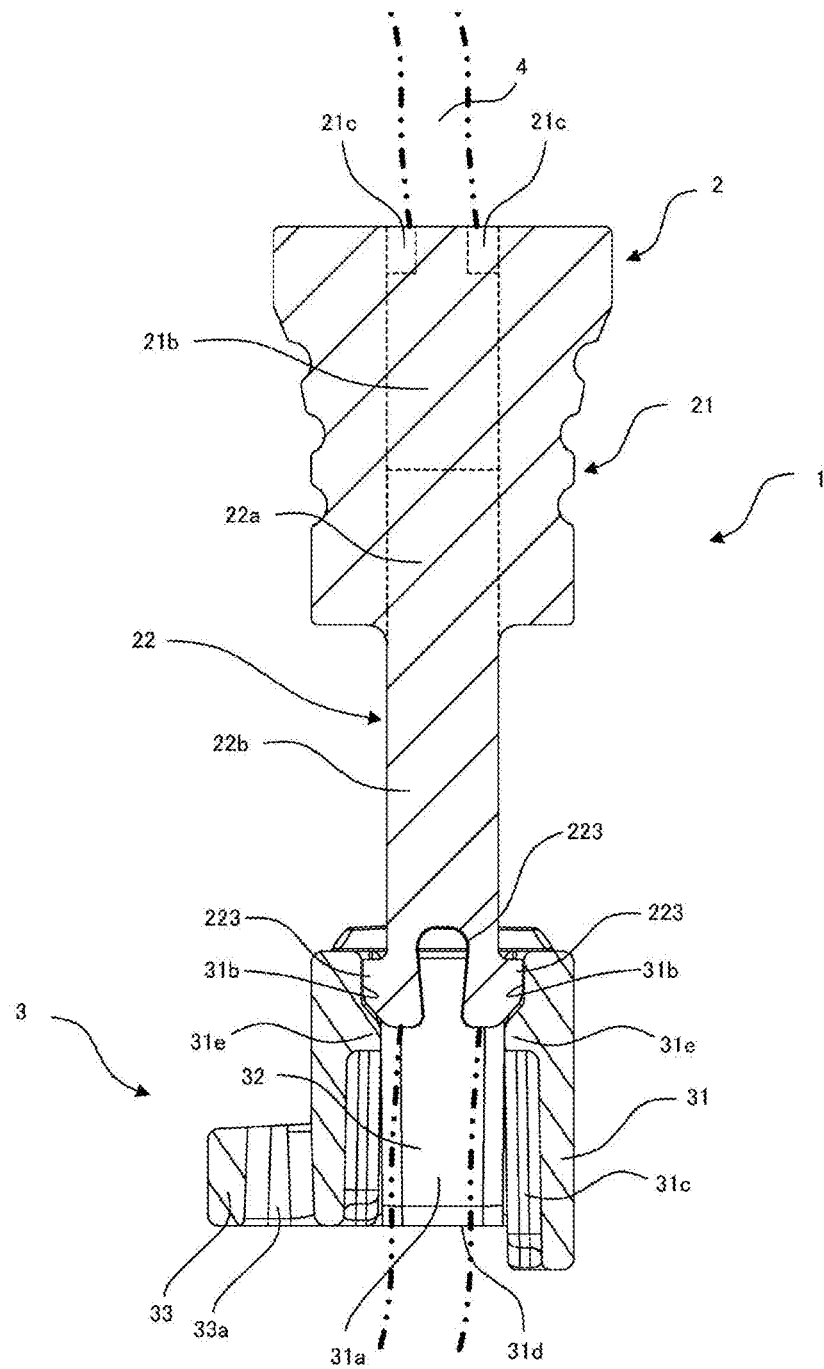
FIG. 11 shows a cross-sectional view of a string stopper immediately before the assembling of the plug and a socket according to the second embodiment.
Figure 12:
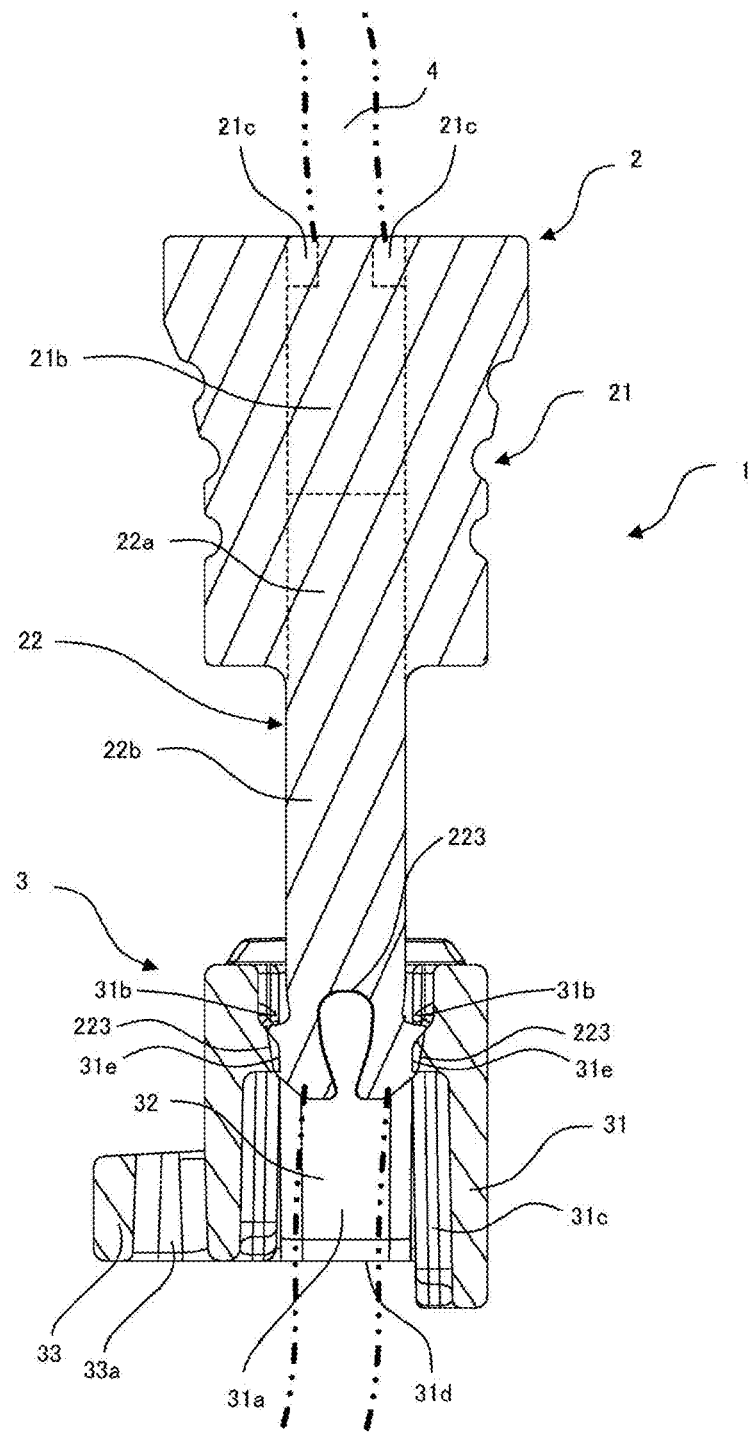
FIG. 12 shows a cross-sectional view of the string stopper in the middle of the assembling of the plug and the socket according to the second embodiment.

FIG. 11 shows a cross-sectional view of the string stopper 1 immediately before the assembling of the plug 2 and the socket 3 according to the second embodiment. FIG. 12 shows a cross-sectional view of the string stopper 1 in the middle of the assembling of the plug 2 and the socket 3 according to the second embodiment.

In the socket 3 according to the second embodiment, a tape attachment portion 33 is formed on a back side surface of the guide portion 31c on one side of the socket base portion 31. A penetrating portion 33a is formed in the tape attachment portion 33 in parallel or substantially parallel to the socket opening 32. A tape to be attached to another member may be passed through the penetrating portion 33a. If the tape attachment portion 33 is formed on the non-insertion side of the socket base portion 31, it is preferable since the tape attachment portion 33 does not interfere with the movement of the plug 2 with respect to the socket 3.

Similarly to the string stopper 1 according to the first embodiment, in the string stopper 1 according to the second embodiment, the string-shaped members 4 are first passed through the plug 2 and the socket 3 before the plug 2 and the socket 3 are assembled. The string-shaped members 4 may have the same material and structure as those of the first embodiment.

Next, as shown in FIG. 11, the positions of the sliding portion 223 of the plug 2 and the recessed portion 31b of the socket 3 are matched. Then, as shown in FIG. 12, the plug 2 and the socket 3 are pressed to advance the sliding portions 223 from the recessed portions 31b to the guide portions 31c. The sliding portion 223 is formed to be larger than an interval between the recessed portion 31b and the guide portion 31c. However, similarly to the first embodiment, each sliding portion 223 according to the second embodiment is formed in a tapered shape from the tip end thereof, and the recessed portions 31b are formed such that an interval therebetween is narrower toward the inner side, and a slit portion 224 is formed on the back side. Therefore, when the plug 2 is further pushed, the sliding portions 223 on both sides are bent so as to approach the slit portion 224 side. Then, the sliding portion 223 rides over the narrow passage portion 31e from the recessed portion 31b.

Figure 13:
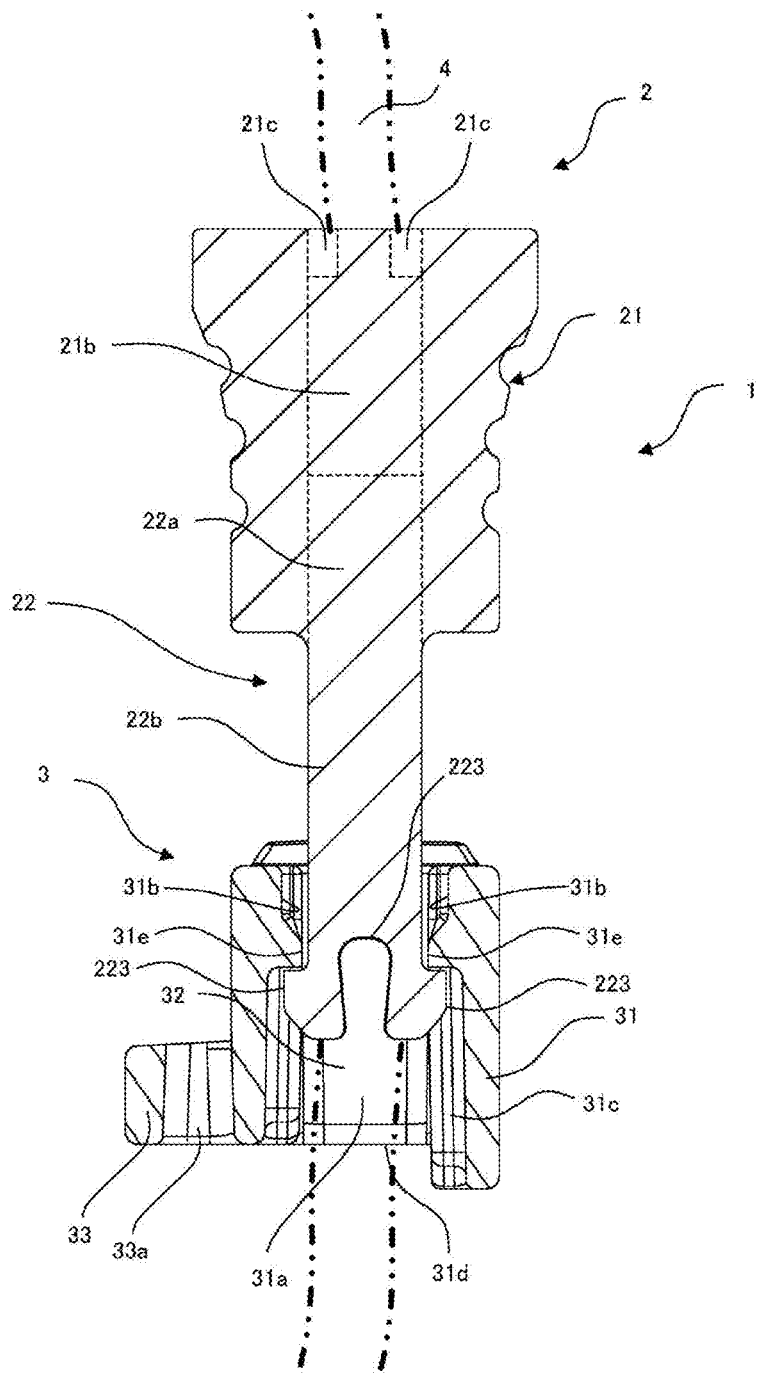
FIG. 13 shows a cross-sectional view of the string stopper immediately after the assembling of the plug and the socket according to the second embodiment.

FIG. 13 shows a cross-sectional view of the string stopper 1 immediately after the assembling of the plug 2 and the socket 3 according to the second embodiment.

When the plug 2 and the socket 3 are pressed, the sliding portion 223 rides over the narrow passage portion 31e from the recessed portion 31b and advances to the guide portion 31c. The sliding portion 223 that once moved to the guide portion 31c is caught by the narrow passage portion 31e and is difficult to move to the recessed portion 31b. Then, the sliding portion 223 moves while being guided into the guide portion 31c. Therefore, the plug 2 can be accurately moved with respect to the socket 3. Then, the string stopper 1 can be accurately fixed to the string-shaped members 4. Further, since the sliding portion 223 is caught by the narrow passage portion 31e, the plug 2 is not separated from the socket 3, and the string stopper 1 can be accurately moved with respect to the string-shaped members 4.

When the plug 2 and the socket 3 are in positions shown in FIG. 13, the string-shaped member is not sandwiched by the locking portion 222 of the plug 2 or the inclined surface 31a of the socket 3 and is movable with respect to the string stopper 1. That is, the string stopper 1 is movable with respect to the string-shaped members.

In the string stopper 1 in this state, the string-shaped member comes into contact with the side surface portion 221 formed of a smooth curved surface, and the deterioration of the string-shaped member can be reduced, and the life of the string-shaped member 4 can be extended.

Figure 14:
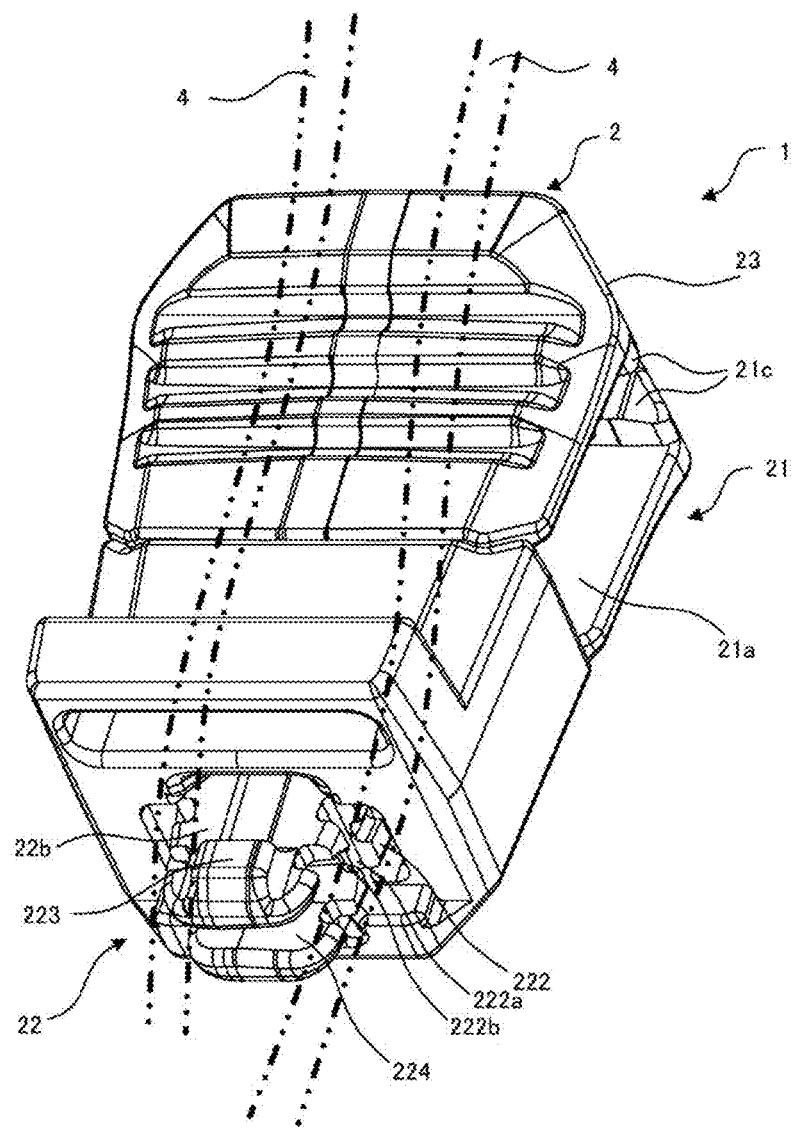
FIG. 14 shows a perspective view of the string stopper according to the second embodiment which is fixed to the string-shaped members.

FIG. 14 shows a perspective view of the string stopper 1 according to the second embodiment which is fixed to the string-shaped members 4.

After the plug 2 and the socket 3 are assembled, when the string stopper 1 according to the second embodiment is fixed to the string-shaped members 4, the plug 2 and the socket 3 are brought close to each other. That is, while the string-shaped members 4 on the plug 2 side are pulled, the plug 2 is further pushed toward the socket 3 side, or while the string-shaped members 4 on the socket 3 side are pulled, the socket 3 is further pushed toward the plug 2 side. Then, the sliding portion 223 further advances into the guide portion 31c, and the string-shaped member 4 is sandwiched between the locking portion 222 of the leg portion 22 of the plug 2 and the inclined surface 31a of the socket and is fixed. That is, the string stopper 1 is fixed to the string-shaped members 4.

As described above, the string stopper 1 according to the second embodiment does not use the elastic action when the string stopper 1 is fixed to the string-shaped members 4. Therefore, the string stopper 1 can be easily fixed to the string-shaped members 4 by merely bringing the plug 2 and the socket 3 relatively close to each other with a small force without applying the elastic action. Further, the string stopper 1 according to the second embodiment does not use an elastic member whose strength decreases due to the creep deformation and which requires a large space. Therefore, the string stopper 1 is small in size, has a small decrease in strength, a long life, and good operability, can move smoothly, and can be accurately fixed to the string-shaped members 4.

Further, in the string stopper 1 according to the second embodiment, the locking portion 222 is formed by the plurality of recessed first grooves 222a and second grooves 222b formed in a part of a flat surface continuous from the side surface portion 221. The string-shaped member 4 comes into contact with the flat surface of the locking portion 222. Accordingly, the deterioration of the string-shaped member 4 can be reduced while the friction is increased, and the life of the string-shaped member 4 can be extended.

When the string stopper 1 is moved from the state in which the string stopper 1 is fixed to the string-shaped members 4 shown in FIG. 14 to the state shown in FIG. 13, the plug 2 and the socket 3 are relatively moved away from each other. That is, while the string-shaped members 4 on the plug 2 side are pulled, the socket 3 is pulled to the opposite side, or while the string-shaped members 4 on the socket 3 side are pulled, the plug 2 is pulled to the opposite side. Then, the plug 2 and the socket 3 are separated from each other, and the string-shaped members 4 are movable with respect to the string stopper 1. That is, the string stopper 1 is movable with respect to the string-shaped members 4.

As described above, the string stopper 1 according to the second embodiment does not use the elastic action when the string stopper 1 is fixed to the string-shaped members 4. Therefore, the string stopper 1 can be easily moved with respect to the string-shaped members 4 by merely bringing the plug 2 and the socket 3 relatively away from each other with a small force without releasing the elastic action. Further, since the elastic member whose strength decreases due to the creep deformation and which requires a large space is not used, the string stopper 1 according to the second embodiment is small in size, has a small decrease in strength, a long life, and good operability, can move smoothly, and can be accurately fixed to the string-shaped members 4. Further, a side surface from the connection portion 21b of the plug base portion 21 toward the protruding portion 22b is opened.

As described above, the string stopper 1 according to the present embodiment includes: a plug 2 including a plug base portion 21 which includes two of plate-shaped portions 21a arranged in parallel and at least one connection portion 21b connecting the two of plate-shaped portions 21a, a leg portion 22 which includes a sandwiched portion 22a sandwiched between parts of the plate-shaped portions 21a, and a tapered rectangular parallelepiped protruding portion 22b protruding from the sandwiched portion 22a, and a plug opening 23 which is formed from the connection portion 21b to both sides of the leg portion 22 by connecting the two of plate-shaped portions 21a with the connection portion 21b at an opposite side of the leg portion 22; and a socket 3 including a socket base portion 31 and a socket opening 32 which is formed of a hole penetrating the socket base portion 31 and having a tapered inclined surface 31a, and which is configured to accommodate a tip end of the protruding portion 22b. The plug 2 and the socket 3 are configured such that, when a string-shaped member 4 is installed, the string-shaped member 4 passes between the protruding portion 22b and the inclined surface 31a, the string-shaped member 4 passing through the plug opening 23, exiting from the plug 2 through a side of the leg portion 22, passing through the socket opening 32 and exiting from the socket 3. Therefore, the string stopper 1 according to the present embodiment is small in size, has a small decrease in strength, a long life, and good operability, can move smoothly, and can be accurately fixed to the string-shaped members 4. Further, in the string stopper 1 according to the present embodiment, since the string-shaped member 4 passes through both the plug opening 23 of the plug 2 and the socket opening 32 of the socket 3, even if the plug 2 and the socket 3 are separated from each other, both do not fall from the string-shaped members 4, and the possibility of losing the plug 2 or the socket 3 is low.

Further, in the string stopper 1 according to the present embodiment, the sandwiched portion 22a includes the side surface portion 221 exposed in the plug opening 23, and the protruding portion 22b includes a locking portion 222 in which a recessed groove is formed on a surface continuous from the side surface portion 221.

Therefore, according to the string stopper 1 of the present embodiment, the string-shaped member 4 comes into contact with the flat surface of the locking portion 222, the deterioration of the string-shaped member 4 can be reduced while the friction is increased, and the life of the string-shaped member 4 can be extended.

In the string stopper 1 according to an embodiment of the present invention, the groove 222a formed in the locking portion includes at least a first groove 222a formed in a predetermined direction and a second groove 222b formed in the direction intersecting the first groove 222a.

Therefore, according to the string stopper 1 of the present embodiment, the deterioration of the string-shaped member 4 can be reduced while the friction is further increased, and the life of the string-shaped member 4 can be extended.

Further, in the string stopper 1 according to the present embodiment, the side surface portion 221 is formed of a curved surface. Therefore, according to the string stopper 1 of the present embodiment, the string-shaped member 4 comes into contact with the curved surface, the deterioration of the string-shaped member 4 can be reduced, and the life of the string-shaped member 4 can be extended.

Further, in the string stopper 1 according to the present embodiment, the protruding portion 22b includes convex sliding portions 223 at tip ends of two surfaces of the sandwiched portion 22a sandwiched between the two of plate-shaped portions 21a. The socket base portion 31 includes a recessed portion 31b formed on the socket opening 32 side and the plug base portion 21 side, a guide portion 31c which guides the sliding portion 223 and which is formed in a groove shape on the socket opening 32 side and an opposite side of the plug base portion 21, and a narrow passage portion 31e protruding between the recessed portion 31b and the guide portion 31c.

Therefore, according to the string stopper 1 of the present embodiment, since the sliding portion 223 moves while being guided into the guide portion 31c, the plug 2 can be accurately moved with respect to the socket 3, and the string stopper 1 can be accurately fixed to the string-shaped members 4. Further, since the sliding portion 223 is caught by the narrow passage portion 31e, the plug 2 is not separated from the socket 3, and the string stopper 1 can be accurately moved with respect to the string-shaped members 4.

Further, in the string stopper 1 according to the present embodiment, the protruding portion 22b includes the groove-shaped slit portion 224 formed between two of the sliding portions 223.

Therefore, according to the string stopper 1 of the present embodiment, at the time of inserting the plug 2 into the socket 3, when the sliding portion 223 is pushed by the narrow passage portion 31e, the tip end of the protruding portion 22b on which the sliding portions 223 are formed is bent toward the slit portion 224 side. Therefore, the plug 2 can be easily inserted into the socket 3 without requiring a large force.

Further, in the string stopper 1 according to the present embodiment, a side surface from the connection portion 21b of the plug base portion 21 toward the protruding portion 22b is opened.

Further, the string stopper 1 according to the present embodiment is fixed only by a frictional force between the string stopper 1 and the string-shaped member 4 by merely bringing the plug 2 and the socket 3 relatively close to each other, and the string stopper 1 is movable with respect to the string-shaped member 4 by merely bringing the plug 2 and the socket 3 relatively away from each other.

Therefore, according to the string stopper 1 of the present embodiment, since the elastic action when the string stopper 1 is fixed to the string-shaped members 4 is not used, the string stopper 1 can be easily fixed to the string-shaped members 4 by merely bringing the plug 2 and the socket 3 relatively close to each other with a small force without applying the elastic action, and the string stopper 1 can be easily moved with respect to the string-shaped members 4 by merely bringing the plug 2 and the socket 3 relatively away from each other with a small force without releasing the elastic action.

Further, in the string stopper 1 according to the present embodiment, a space between the connection portions 21b of the plug 2 is disposed on an inner side of an extension line E of a portion of the protruding portion 22b of the leg portion 22, the portion sandwiching the string-shaped member 4 with the inclined surface 31a of the socket 3.

Therefore, according to the string stopper 1 of the present embodiment, an appropriate frictional force can be generated between the string-shaped member 4 and the leg portion 22, and the plug 2 and the socket 3 can be held accurately only by the frictional force.

Further, when an interval between the connection portions 21b is set as A, a maximum width of the leg portion 22 is set as B, and a diameter of the string-shaped member 4 is set as D in the string stopper 1 according to the present embodiment, a following condition (1) is satisfied.

$$D<A<B+2D \quad (1)$$

Therefore, according to the string stopper 1 of the present embodiment, an appropriate frictional force can be generated between the string-shaped member 4 and the leg portion 22, and the plug 2 and the socket 3 can be held more accurately only by the frictional force.

Further, in the string stopper 1 according to the present embodiment, a relationship between the interval A of the connection portions 21b and the maximum width B of the leg portion 22 satisfies a following condition (2).

$$0.3<B/A<2.0 \quad (2)$$

Therefore, according to the string stopper 1 of the present embodiment, an appropriate frictional force can be generated between the string-shaped member 4 and the leg portion 22, and the plug 2 and the socket 3 can be held more accurately only by the frictional force.

Further, in the string stopper 1 according to the present embodiment, in the socket 3, a tape attachment portion 33 to which a tape to be attached to another member is attached, is formed on a back side of the guide portion 31c on one side of the socket base portion 31.

Therefore, the string stopper 1 of the present embodiment is preferable since the tape to be attached to another member does not become a hindrance when the plug 2 is moved with respect to the socket 3.

Although various embodiments of the present invention have been described, the present invention is not limited to these embodiments, and an embodiment configured by appropriately combining the configurations of the respective embodiments is also included in the scope of the present invention.

What is claimed is:

1. A string stopper comprising:
   a plug including:
      a plug base portion which includes two plate-shaped portions arranged in parallel and at least one connection portion connecting the two plate-shaped portions;
      a leg portion which includes a sandwiched portion sandwiched between parts of the plate-shaped portions, and a tapered rectangular parallelepiped protruding portion protruding from the sandwiched portion; and
      a plug opening which is formed from the connection portion to both sides of the leg portion by connecting the includes two plate-shaped portions with the connection portion at an opposite side of the leg portion; and
   a socket including:
      a socket base portion;
      and a socket opening which is formed of a hole penetrating the socket base portion and having a tapered inclined surface, and which is configured to accommodate a tip end of the protruding portion,
   wherein the plug and the socket are configured such that, when a string-shaped member is installed, the string-shaped member passes between the protruding portion and the inclined surface, the string-shaped member passing through the plug opening, exiting from the plug through a side of the leg portion, passing through the socket opening and exiting from the socket.

2. The string stopper according to claim 1,
   wherein the sandwiched portion includes a side surface portion exposed in the plug opening, and
   wherein the protruding portion includes a locking portion in which a recessed groove is formed on a surface continuous from the side surface portion.

3. The string stopper according to claim 2,
   wherein the groove formed in the locking portion includes at least a first groove formed in a predetermined direction and a second groove formed in a direction intersecting the first groove.

4. The string stopper according to claim 2,
   wherein the side surface portion is formed of a curved surface.

5. The string stopper according to claim 1,
   wherein the protruding portion includes convex sliding portions at tip ends of two surfaces of the sandwiched portion sandwiched between the includes two plate-shaped portions, and
   wherein the socket base portion includes:
      a recessed portion formed on the socket opening side and the plug base portion side;
      a guide portion which guides the sliding portion and which is formed in a groove shape on the socket opening side and an opposite side of the plug base portion; and
      a narrow passage portion protruding between the recessed portion and the guide portion.

6. The string stopper according to claim 5,
   wherein the protruding portion includes a groove-shaped slit portion formed between two of the sliding portions.

7. The string stopper according to claim 5,
   wherein in the socket, a tape attachment portion to which a tape to be attached to another member is attached, is formed on a back side of the guide portion on one side of the socket base portion.

8. The string stopper according to claim 1,
   wherein a side surface from the connection portion of the plug base portion toward the protruding portion is opened.

9. The string stopper according to claim 1,
   wherein the string stopper is fixed only by a frictional force between the string stopper and the string-shaped member by merely bringing the plug and the socket relatively close to each other, and
   wherein the string stopper is movable with respect to the string-shaped member by merely bringing the plug and the socket relatively away from each other.

10. The string stopper according to claim 1,
    wherein a space between the connection portions of the plug is disposed on an inner side of an extension line of a portion of the protruding portion of the leg portion, the portion sandwiching the string-shaped member with the inclined surface of the socket.

11. The string stopper according to claim 1,
    wherein when an interval between the connection portions is set as A, a maximum width of the leg portion is set as B, and a diameter of the string-shaped member is set as D, a following condition (1) is satisfied.

$$D<A<B+2D \quad (1)$$

12. The string stopper according to claim 11,
    wherein a relationship between the interval A of the connection portions and the maximum width B of the leg portion satisfies a following condition (2).

$$0.3<B/A<2.0 \quad (2)$$

* * * * *